L. A. FOGG.
VEHICLE SPRING.
No. 187,262. Patented Feb. 13, 1877.
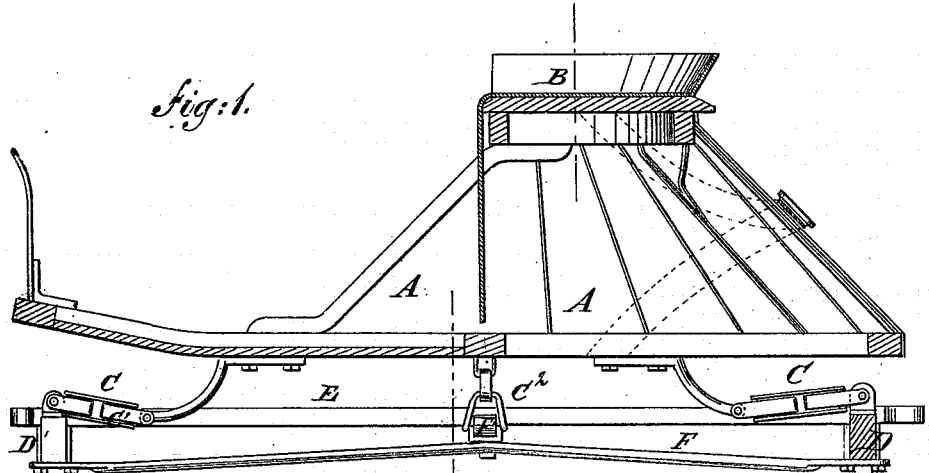
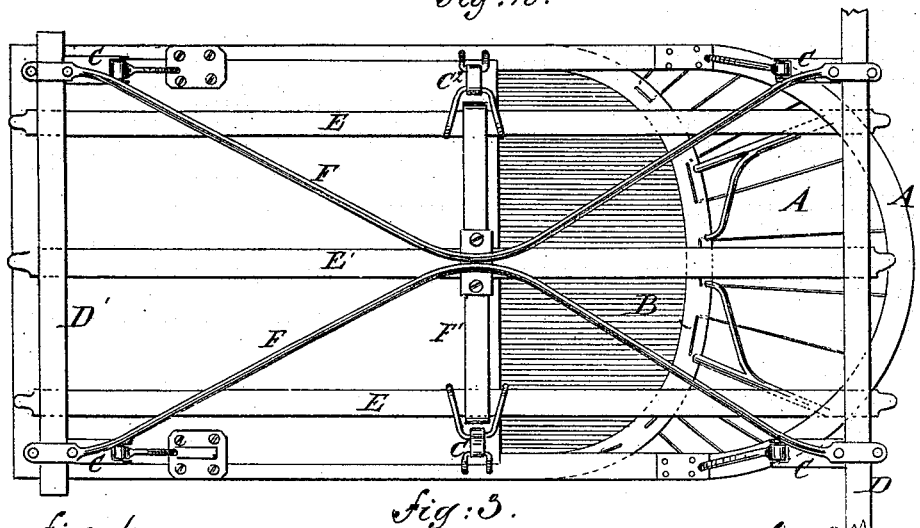
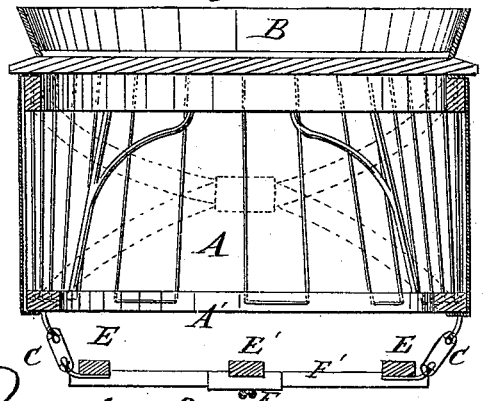
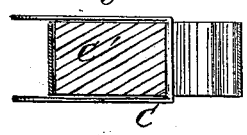
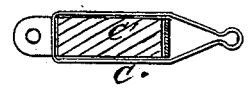
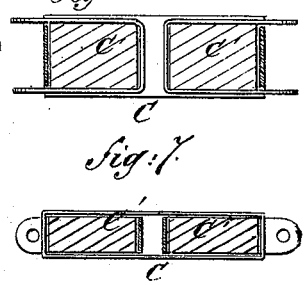
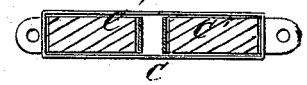
WITNESSES:
INVENTOR:
L. A. Fogg
BY
ATTORNEYS.

UNITED STATES PATENT OFFICE.

REISSUED

LUCIUS A. FOGG, OF PARKER CITY, PENNSYLVANIA.

IMPROVEMENT IN VEHICLE SPRINGS.

Specification forming part of Letters Patent No. 187,262, dated February 13, 1877; application filed November 11, 1876.

*To all whom it may concern:*

Be it known that I, L. A. FOGG, of Parker City, in the county of Armstrong and State of Pennsylvania, have invented a new and useful Improvement in Spring Vehicles and other Apparatus, of which the following is a specification:

Figure 1 is a vertical, longitudinal section of a buggy or light vehicle. Fig. 2 is a plan view of the same, as seen from below. Fig. 3 is a vertical cross-section of the buggy. Fig. 4 is a plan view of a single spring, with a part of the metal removed, showing the rubber. Fig. 5 is a side view of a single spring, with a part of the metal removed, showing the rubber. Fig 6 is a plan view of a double spring, with a part of the metal removed, showing the rubber. Fig. 7 is a side view of a double spring, with a part of the metal removed, showing the rubber. Fig. 8 is a plan view of two single springs, showing the method of combining two or more springs to form a compound spring or elastic chain. Similar letters of reference indicate corresponding parts.

The object of this invention is to simplify and cheapen the cost of construction of spring vehicles, and other apparatus in which springs are employed.

This invention consists of a spring made of two or more flat pieces of metal, C, in the form of a box, the parts being interlocked and the space between them being filled with rubber or other elastic material $C^1$; this is called a single spring. In some cases two half boxes are interlocked with a third piece of a similar character, thus making two spaces, both filled with rubber; this is called a double spring. Or, if desired, two or more springs can be attached to each other, forming a compound spring or chain, as shown in Fig. 8. The rubber space may be completely filled with the rubber $C^1$, or the rubber may be notched or partially cut away, to regulate the elasticity of the spring. The springs C C are attached at one end to the upper parts of the hinder axletree D, and rocker D', or to the lower frame of the buggy, by means of bolt-joints, in the usual manner; and at their other ends are attached to the body A of the buggy, by brackets, in such a manner as to carry the weight of the body and load, holding the rubbers in the springs in a state of compression. The lower frame of the buggy has two or more parallel longitudinal bars, E E, firmly secured to the upper part of the hinder axletree D, and rocker D', and strengthened by a cross-girt, E', in the center; and there are also two metal braces or rods, F F, extending diagonally from the corners to the center; these rods F F, being firmly secured to the lower sides of the hinder axletree D, and rocker D', and also to the cross-girt E' in the center, prevent the axletree D, or rocker D', from being turned over by the action of the springs and load. On each side of the lower frame, in the center of its length, is a side-brace or link, $C^2$, secured to the lower frame, and also to the body A of the buggy, to prevent the body from being tipped sideways as in getting in or out. This brace $C^2$ is made of metal, and consists of two brackets and an intermediate link. The brackets are secured to the frame and body respectively, and the bolt-holes in the link, by means of which it is attached to the brackets, are elongated to permit some freedom of motion when not in action. The body A of the buggy consists of a light wooden frame, A', and seat, B, with iron braces to assist in supporting the seat and also to give form to the covering. The form of this may be varied to suit the taste, and if desired a top may be added. The covering may be leather, varnished cloth, or other suitable material. The space below the seat B is shown as having no floor, but may floored or covered with a lattice or woven wire for the reception of packages or light articles.

I am aware that the broad idea of making springs, consisting of rubber placed between loops that pull in opposite directions, is old, and this I do not claim; but—

Having thus described my invention, I claim as new and desire to secure by letters-patent—

The combination of frame E E', F, axle D, and rocker D', with the springs C and median brackets connected by links $C^2$, to support a vehicle-body as shown and described.

LUCIUS A. FOGG.

Witnesses:
JOHN A. BROWN,
GEO. A. KLUGH.